United States Patent [19]

Keller

[11] Patent Number: 4,655,243

[45] Date of Patent: Apr. 7, 1987

[54] AUTOMATIC POOL FILLER

[76] Inventor: Kris Keller, 517 S. Paula Dr., Dunedin, Fla. 33528

[21] Appl. No.: 801,302

[22] Filed: Nov. 25, 1985

[51] Int. Cl.$^4$ ............................................. F16K 31/34
[52] U.S. Cl. .................................. 137/403; 137/414; 137/426; 4/508; 251/46
[58] Field of Search ............... 137/426, 403, 406, 412, 137/413, 414; 4/508; 251/46

[56] References Cited

U.S. PATENT DOCUMENTS

| | | | |
|---|---|---|---|
| 2,685,301 | 8/1954 | Dreier | 137/403 |
| 3,837,015 | 9/1974 | Whitaker | 4/508 |
| 3,895,645 | 7/1975 | Johnson | 137/414 |
| 4,065,095 | 12/1977 | Johnson | 137/414 |
| 4,180,096 | 12/1979 | Johnson | 137/414 |
| 4,240,606 | 12/1980 | Johnson | 251/127 |

*Primary Examiner*—George L. Walton
*Attorney, Agent, or Firm*—Ronald E. Smith

[57] ABSTRACT

A device that maintains the water level of a swimming pool within acceptable limits. The device includes a valve member that has a valve chamber and a diaphragm chamber. The valve member is held in submerged relation to the water level in the pool by a weighted member that is provided with a stabilizer so that the correct position of the submerged valve member is maintained at all times. A garden hose is connected at one end to a source of water under pressure and its other end is connected to the valve chamber. One side of the diaphragm is exposed to the water in the pool and its other side is exposed to atmospheric pressure so that when the pool level changes, the change is detected by the diaphragm. An on-off valve in the valve chamber is normally closed so that a valve at the water source may be left in its open position at all times. A drop in the water level displaces the diaphragm and the displacement of the diaphragm opens the valve in the valve chamber so that water from the water source is admitted into the pool. The valve in the valve chamber closes when the water level rises to a desired level, which rise is detected by the diaphragm.

2 Claims, 4 Drawing Figures

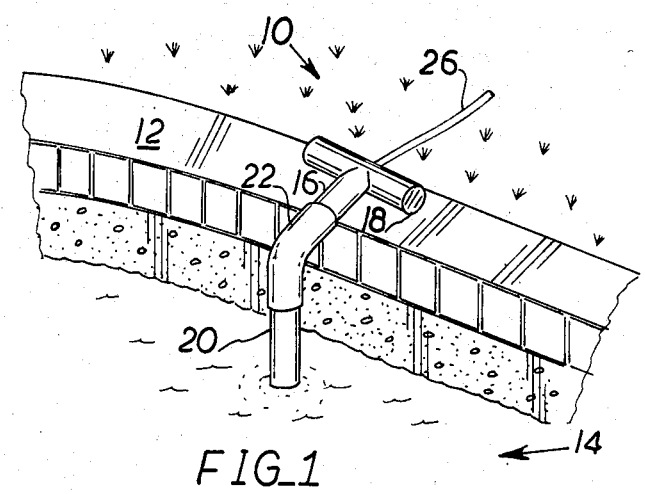
FIG_1
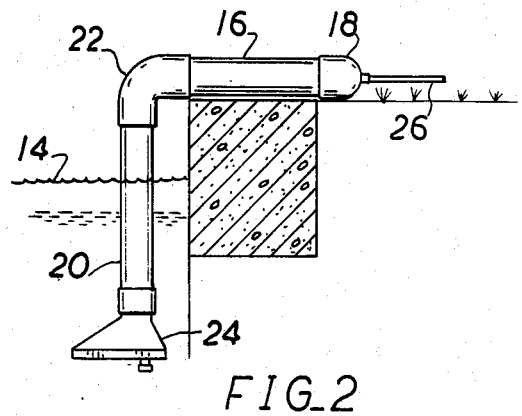
FIG_2

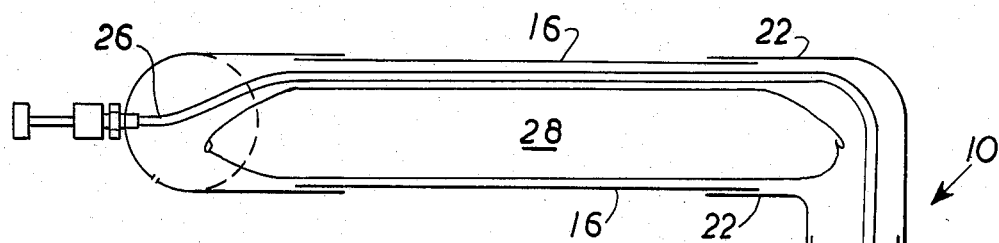
FIG_3
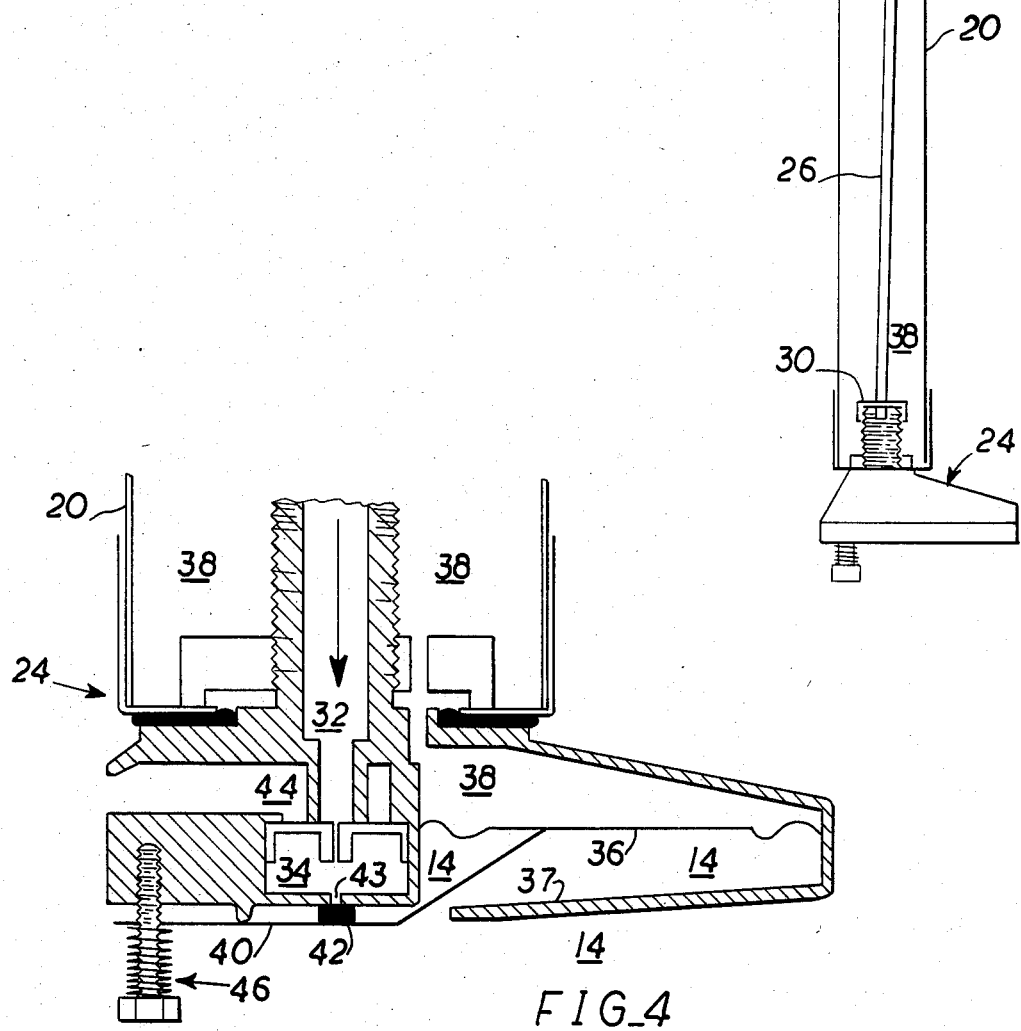
FIG_4

AUTOMATIC POOL FILLER

1. FIELD OF THE INVENTION

This invention relates to devices that add water to a swimming pool in response to the detection of a preselected drop in the level thereof. More particularly, the subject device incorporates a valve member of the type heretofore known to maintain the water level in a toilet flush tank.

2. DESCRIPTION OF THE PRIOR ART

Most swimming pools are provided with a skimmer means in the form of a shallow chamber that is offset from but confluent with the main pool. A suction outlet at the bottom of the chamber returns water therein to the suction side of a circulation pump, and a one-way door member allows debris floating on the surface of the pool to enter the chamber and to accummulate therein until removed by the pool owner or maintenance personnel. When the water level in the shallow chamber drops to a point where air can enter the suction outlet, damage to the circulation pump can occur. It is therefore desireable to maintain the water level in the main pool at a level that is above the bottom of the shallow chamber so that the suction inlet therein is not exposed to air.

Many pool owners simply add water to their pool with a garden hose when the water level drops; this method is not satisfactory when the pool owner is away from home. Pool owners often ask their neighbors to handle this chore in their absence, but all neighbors may not be willing to do the chore nor can neighbors be relied upon to do the chore properly.

One alternative is to hire a pool service company to take care of the pool as needed in one's absence, but pool service companies are not inexpensive and are often as unreliable as neighbors.

A number of devices are known that add water to a swimming pool when its level drops below a preselected threshold. Typically, these devices include a float member of the type often provided in toilet flush tanks. As the water level drops, the float pivots about a pivot point until it reaches a position where it activates a valve that admits water into the pool. These float members are unsightly because they float on the surface of the pool, and the mechanisms with which the floats are used are somewhat expensive and deteriorate rapidly in the environment of a swimming pool.

There is a need for a device that maintains a preselected level of water in a swimming pool in the absence of toilet flush tank float valves, but the prior art includes no such device.

SUMMARY OF THE INVENTION

The subject invention includes a horizontally disposed weighted tubular member that is positioned on the deck of a pool and stabilized against rolling by a stabilizer bar. A vertically disposed tubular member is connected to the weighted tubular member by an elbow joint, and a valve member of the type having a diaphragm therein is secured to the lowermost end of the vertically disposed tubular member. The length of the vertically disposed tubular member is sufficient to submerge the valve member about one foot below the optimal level of the pool.

One side of the diaphragm member is vented to atmosphere through the vertically disposed tubular member, the elbow joint, and the horizontally disposed tubular member. The other side of the diaphragm member is exposed to the water so that as the depth of the water changes with respect to the fixed position valve member, the position of the diaphragm changes.

The diaphragm operates an on-off valve member which is disposed in a valve chamber adjacent the diaphragm chamber. A garden hose is connected to a municipal water supply and extended to the novel device; the hose is inserted into the horizontally disposed weighted tubular member, through the elbow joint, and through the vertically disposed tubular member until it reaches the valve chamber where it is connected on the inlet side thereof. The on-off valve is normally closed; thus, after the hose has been hooked up in the manner described above, the municipal water supply valve is opened so that water may flow through the hose until it reaches the inlet side of the on-off valve. The homeowner simply leaves the municipal water supply valve open at all times after the initial installation of the subject device has been made, as the flow of water therefrom is thereafter controlled by the device's on-off valve.

The on-off valve is under the control of the diaphragm; thus, it opens when the diaphragm detects a drop in the water level of the pool, which drop is manifested by a reduced pressure differential between the side of the diaphragm exposed to ambient and the submerged side thereof. In this manner, a drop in the level of the pool water below a preselected height causes the on-off valve to be opened until the level of water is restored to a desired height which restoration of water level is also detected by the diaphragm.

It is therefore clear that the primary object of this invention is to provide an automatic swimming pool filler.

Another object is to provide such a filler in the form of a device that includes readily available parts so that its manufacturing cost and hence its retail price is low.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a perspective view of the device in its environment;

FIG. 2 is a side elevational view of the device in its environment;

FIG. 3 is a more detailed side elevational view of the device; and

FIG. 4 is a sectional view of the valve chamber and the diaphragm chamber of the device.

Similar reference numerals refer to similar parts throughout the several views of the drawings.

DETAILED DESCRIPTION OF THE PREFERRED EMBODIMENT

Referring now to FIG. 1, it will there be seen that an illustrative embodiment of the invention is designated 10 as a whole.

The automatic pool filler 10 is positioned atop a pool deck 12 so that its horizontal portion overlies pool deck 12 and its vertical portion extends into the water 14.

The horizontal portion of the filler 10 includes tubular member 16 and "T"-shaped stabilizer member 18 fixedly secured thereto.

The vertical portion of filler 10 includes tubular member 20 which is fixedly secured to horizontal tubular member 16 by elbow joint member 22.

A valve member 24 is fixedly secured to the lowermost end of vertical tubular member 20. Valve member 24 is described in U.S. Pat. Nos. 3,895,645 (July 22, 1976), 4,065,095 (Dec. 27, 1977), 4,180,096 (Dec. 25, 1979), and 4,240,606 (Dec. 23, 1980), all to Johnson. As will be more fully set forth hereinafter in connection with FIG. 4, valve member 24t includes a valve chamber having an on-off valve therein and a diaphragm chamber having a diaphragm therein. The Johnson patents show the valve member in a toilet flush tank. One side of the diaphragm is vented to atmosphere through the flush tank floor, and the other side of the diaphragm is exposed to water so that the position of the diaphragm is a function of the pressure differential existing therebetween. Since the amount of water pressure appearing on a submerged object is a function of the depth of the object, the position of the diaphragm changes in response to changes in the water level in the flush tank.

Hose member 26 extends from a municipal water supply (not shown) to the inlet side of the valve member in the valve chamber. The valve member is normally closed so that the municipal water supply may be left in its "on" position at all times. Thus, water under pressure is present in hose 26 along its extent at all times. In response to a dropping of the pool water level as a result of evaporation or other cause, the position of the diaphragm changes and effects an opening of the valve member in the manner described in the Johnson patents. The valve remains open until the water level in the pool returns to the predetermined desired level, at which time the pressure differential across the diaphragm returns it to its initial value and such diaphragm in turn effects closure of the on-off valve member.

The subject device differs in a number of ways from the Johnson device. Johnson's valve member is fixedly secured directly to the bottom of a flush tank, and one side of his diaphragm is vented directly to atmosphere through an opening formed in the flush tank floor, as aforesaid. The subject device is submerged to a depth of approximately one foot (i.e., the length of vertical tubular member 20 is chosen so that valve member 24 will be about one foot below the level of the swimming pool water when the pool is at its desired level); the valve member 24 is not attached to a floor or other mounting surface but instead is positioned at the end of the vertical tubular member 20; the vented side of the diaphragm is not vented through a flush tank floor but instead is vented through the vertically disposed and horizontally disposed tubular members 20 and 16, respectively; the water supply is municipal in both the Johnson flush tank system and the present system but the elongate hose 26 is not found in the Johnson system; the present system, moreover, includes weighted tubular member 16 and stabilizer member 18, all not found in the Johnson apparatus.

Reference should now be made to FIGS. 3 and 4 where the novel device is shown in more detail.

The weight member employed to maintain horizontal tube 16 in its operative position is shown in FIG. 3 and designated 28. The coupling of hose member 26 to the valve chamber is denoted 30.

FIG. 4 shows valve member 24 in detail. The valve chamber referred to above is denoted by the reference numerals 32 and 34, numeral 32 indicating the inlet side of the valve which is confluent with the municipal water supply and numeral 34 indicating the outlet side of the valve which opens in response to a drop in water level as detected by the diaphragm.

The diaphragm is denoted 36 and divides its chamber into the vented portion 38 which is maintained at atmospheric pressure due to the vent; the numeral 38 is also positioned interiorly of tube 20 to indicate that the interior of tube 20 is in fluid communication with chamber 38.

The lower side of diaphragm 36 is in contact with the pool water 14 and is termed the water chamber 37.

Reference numeral 40 indicates an arm that is connected to diaphragm 36 as shown and which extends to pilot valve 42 as indicated. Pilot valve 42 is depicted in its normally closed position; when the pool level drops, the pressure in water chamber 37 decreases which causes diaphragm 36 and hence arm 40 to be displaced downwardly, which displacement separates pilot valve 42 from its seated position with respect to opening 43. Pressure in chamber 34 is thus allowed to drop, thereby unseating the main valve. This allows water in valve chamber 32, supplied by the normally open municipal water supply, to enter valve chamber 34; water exits chamber 34 through water outlet 44 and thus enters the pool as desired.

The tension on arm 40 can be adjusted by manipulation of adjusting screw 46. This allows the pool owner to adjust the sensitivity of device 10 so that the water level can be maintained relatively high, low, or at whatever level the owner chooses to maintain. Screw 46 is spring-loaded as shown in FIG. 4; thus, by advancing or tightening screw 46, the pool owner increases the pressure on diaphragm 36 so that it takes a greater drop in the water level of the pool to displace said diaphragm.

Thus, a new use for a known valve has been disclosed, the new use being made possible by the addition of the parts disclosed herein.

It will thus be seen that the objects set forth above, and those made apparent from the foregoing description, are efficiently attained and since certain changes may be made in the above construction with out departing from the scope of the invention, it is intended that all matters contained in the foregioing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, that which is claimed is:

1. A device that adds water to a swimming pool responsive to the detection of a preselected decrease in the water level thereof, comprising:
 a source of water under pressure having an on-off valve continuously set in its on position so that water under pressure is continuously available from said source;

a submerged valve member having a valve chamber and a diaphragm chamber;

an elongate hose member disposed in fluid communication relation between said continuously on source of water under pressure and said valve chamber, said hose member operative to continuously communicate the water under pressure from said source to said valve chamber;

said valve chamber having a normally closed on-off valve means disposed therein, said valve chamber having an inlet in continuous fluid communication with said source of water under pressure via said hose member and having an outlet in continuous fluid communication with the water in said swimming pool;

a valve member positioning means for maintaining said submerged valve member at a preselected depth relative to a preselected desired level of water in said pool;

said valve member positioning means including a first horizontally disposed pipe member, a second vertically disposed pipe member interconnected to said first pipe member by an elbow member, and a stabilizing means being positioned on a surface outside of the pool, said stabilizing means prevents the first pipe member from rolling with respect to the surface outside of the pool;

said elongate hose member being positioned interiorly of said first and second pipe members; said hose member being maintained within said first and second pipe members by a maintaining means to prevent said hose member from moving relative to said first and second pipe members;

said first pipe member overlying the surface outside of said pool;

said on-off valve means being operable by said diaphragm member;

a first opening formed in a first side of said diaphragm chamber to vent a first side of said diaphragm member to atmosphere through said first and second pipe members;

a second opening formed in a second side of said diaphragm chamber to open a second side of said diaphragm member to water in said pool;

and said on-off valve means opening in response to the detection by said diaphragm member of a decrease in the level of the water of said pool, said detection being a function of the difference in pressure between the first and second sides of said diaphragm member which pressure differential is a function of the depth of the diaphragm member in relation to the level of water in said pool;

said on-off valve means returning to its closed position responsive to the level of water in said pool returning to a level where the distance between said level and said diaphragm member is sufficient to restore the diaphragm member to its position which closes said on-off means.

2. The device of claim 1, said maintaining means further comprising weighted means for maintaining said first pipe member in overlying relation to a pool deck, said weighted means including a weighted member positioned interiorly of said first pipe member.

* * * * *